(12) United States Patent
Uhm et al.

(10) Patent No.: US 8,613,197 B2
(45) Date of Patent: Dec. 24, 2013

(54) TURBINE COMBUSTOR WITH FUEL NOZZLES HAVING INNER AND OUTER FUEL CIRCUITS

(75) Inventors: Jong Ho Uhm, Simpsonville, SC (US); Thomas Edward Johnson, Greer, SC (US); Kwanwoo Kim, Greer, SC (US)

(73) Assignee: General Electric Company, Schenectady, NY (US)

( * ) Notice: Subject to any disclaimer, the term of this patent is extended or adjusted under 35 U.S.C. 154(b) by 528 days.

(21) Appl. No.: 12/850,763

(22) Filed: Aug. 5, 2010

(65) Prior Publication Data

US 2012/0031102 A1  Feb. 9, 2012

(51) Int. Cl.
*F02C 1/00* (2006.01)
*F02G 3/00* (2006.01)

(52) U.S. Cl.
USPC ............ 60/746; 80/747; 80/748; 80/737

(58) Field of Classification Search
USPC .......... 60/742, 746, 747, 748, 804, 737, 740, 60/733
See application file for complete search history.

(56) References Cited

U.S. PATENT DOCUMENTS

| | | | |
|---|---|---|---|
| 4,305,255 A | 12/1981 | Davies et al. | |
| 5,193,346 A * | 3/1993 | Kuwata et al. | 60/737 |
| 5,235,814 A * | 8/1993 | Leonard | 60/738 |
| 5,263,325 A * | 11/1993 | McVey et al. | 60/738 |
| 5,339,635 A * | 8/1994 | Iwai et al. | 60/733 |
| 5,479,782 A | 1/1996 | Parker et al. | |
| 6,038,861 A * | 3/2000 | Amos et al. | 60/737 |
| 6,672,073 B2 * | 1/2004 | Wiebe | 60/796 |
| 7,185,494 B2 * | 3/2007 | Ziminsky et al. | 60/746 |
| 7,540,154 B2 * | 6/2009 | Tanimura et al. | 60/742 |
| 7,546,735 B2 * | 6/2009 | Widener | 60/746 |
| 7,546,736 B2 * | 6/2009 | Amond et al. | 60/747 |
| 2001/0004827 A1 * | 6/2001 | Vandervort et al. | 60/39.55 |
| 2006/0101814 A1 * | 5/2006 | Saitoh et al. | 60/377 |
| 2008/0184708 A1 * | 8/2008 | Moriwaki et al. | 60/747 |
| 2009/0077972 A1 | 3/2009 | Singh | |
| 2010/0101229 A1 * | 4/2010 | York et al. | 60/737 |
| 2010/0192581 A1 * | 8/2010 | Ziminsky et al. | 60/737 |
| 2012/0011854 A1 * | 1/2012 | Khan et al. | 60/772 |

* cited by examiner

*Primary Examiner* — William H Rodriguez
(74) *Attorney, Agent, or Firm* — Nixon & Vanderhye P.C.

(57) ABSTRACT

A combustor cap assembly for a turbine engine includes a combustor cap and a plurality of fuel nozzles mounted on the combustor cap. One or more of the fuel nozzles would include two separate fuel circuits which are individually controllable. The combustor cap assembly would be controlled so that individual fuel circuits of the fuel nozzles are operated or deliberately shut off to provide for physical separation between the flow of fuel delivered by adjacent fuel nozzles and/or so that adjacent fuel nozzles operate at different pressure differentials. Operating a combustor cap assembly in this fashion helps to reduce or eliminate the generation of undesirable and potentially harmful noise.

16 Claims, 8 Drawing Sheets

TURBINE COMBUSTOR WITH FUEL NOZZLES HAVING INNER AND OUTER FUEL CIRCUITS

This invention was made with Government support under Contract No. DE-FC26-05NT42643, awarded by the US Department of Energy (DOE). The Government has certain rights in this invention

BACKGROUND OF THE INVENTION

Turbines used in the electrical power generation industry typically include a plurality of combustors which are arranged concentrically around the exterior of the compressor section of the turbine. Within each combustor, a plurality of fuel nozzles are typically mounted on a combustor cap that is located near the upstream end of the combustor. Compressed air flows through and past the nozzles to reach a combustion zone within the combustor. As the air travels through and past the fuel nozzles, fuel is injected into the airflow, and the air and the fuel mix together to produce a fuel-air mixture which is ignited in the combustion zone of the combustor.

In many combustors, one fuel nozzle will be located at the center of the combustor cap, and a plurality of nozzles will be arranged around the exterior of the center nozzle in a symmetric fashion.

During some operational conditions, only a subset of all of the available fuel nozzles will be delivering fuel into the flow of air. For instance, in some operational conditions, fuel will only be delivered through the center fuel nozzle. In other instances, fuel may be delivered through the center fuel nozzle and a subset of the fuel nozzles surrounding the center nozzle.

In some combustors, when immediately adjacent fuel nozzles are both delivering fuel into the flow of air, the combusting flow of fuel and air interacts to produce an audible noise. The generation of the audible noise by itself is undesirable. However, the vibrations that generate the noise can also be physically damaging to the combustor over an extended period of time. Accordingly, the generation of such audible noise is undesirable.

Such noise generation may occur, for example, when the nozzles are burning high hydrogen content fuel. The burning of high hydrogen can result in combustion dynamic tones at higher than 1 kHz.

BRIEF DESCRIPTION OF THE INVENTION

In a first aspect, the invention is embodied in a combustor cap assembly for a turbine engine which includes a combustor cap and a plurality of fuel nozzles mounted on the combustor cap. At least one of the plurality of fuel nozzles includes a first fuel circuit that delivers fuel from only a central portion of a downstream end of the fuel nozzle. In addition, a second fuel circuit delivers fuel from only an outer annular portion of the downstream end of the fuel nozzle. A flow of fuel through the first and second fuel circuits is independently controllable.

In another aspect, the invention may be embodied in a combustor cap assembly for a turbine engine which includes a combustor cap, a central fuel nozzle mounted at a center of the combustor cap, a first subset of fuel nozzles mounted symmetrically around the central fuel nozzle, and a second subset of fuel nozzles that are also mounted symmetrically around the central fuel nozzle. The central fuel nozzle and the first subset of fuel nozzles all have a first fuel circuit that delivers fuel only from a central portion of a downstream end of the fuel nozzle. Those fuel nozzles also include a second fuel circuit that delivers fuel from only an outer annular portion of a downstream end of the fuel nozzle. A flow of fuel through the first and second fuel circuits is independently controllable.

The invention may also be embodied in a method of operating a combustor of a turbine engine where the combustor includes a plurality of fuel nozzles mounted on a combustor cap. A central fuel nozzle is mounted at the center of the combustor cap, and a first subset of the remaining fuel nozzles are mounted on the combustor cap symmetrically around the central fuel nozzle. A second subset of the remaining fuel nozzles are also mounted on the combustor cap symmetrically around the central fuel nozzle. The central fuel nozzle includes a first fuel circuit that delivers fuel from only a central portion of a downstream end of the fuel nozzle. A second fuel circuit of the central fuel nozzle delivers fuel from only an outer annular portion of the downstream end of the fuel nozzle. A flow of fuel through those first and second fuel circuits is independently controllable. The method comprises operating the combustor in a first operational condition where fuel is only delivered from the first fuel circuit of the central fuel nozzle, and operating the combustor in a second operational condition where fuel is only delivered from a first fuel circuit of the central fuel nozzle and from the second subset of the fuel nozzles.

DETAILED DESCRIPTION OF THE INVENTION

As explained above, when the combustor cap assembly includes a plurality of fuel nozzles which are mounted on a combustor cap, and when immediately adjacent fuel nozzles are both delivering fuel into a flow of air within the combustor, flame interactions between the two adjacent fuel nozzles can cause the generation of undesirable audible noise, particularly when high concentrations of hydrogen are being burned with other fuels, such as natural gas, nitrogen, carbon monoxide and other similar fuels. It is possible to reduce or eliminate the noise generated by the interaction of two adjacent fuel nozzles by taking certain actions.

For instance, it may be possible to utilize only a subset of all of the fuel nozzles. And if only non-adjacent fuel nozzles are delivering fuel into the flow of air, this can reduce or eliminate the generation of undesirable noise. Unfortunately, it is often impossible to operate the combustor so that only non-adjacent nozzles are delivering fuel.

If two adjacent fuel nozzles are both delivering fuel into the air flow, operating adjacent fuel nozzles at different pressure differentials can also help to reduce or eliminate the generation of undesirable noise. For each nozzle, the pressure differential is the difference between the pressure upstream of the nozzle and the pressure downstream of the nozzle. And because the pressure downstream of all of the nozzles is approximately the same, one can generally only vary the pressure differential between adjacent nozzles by varying the pressure upstream of one of the nozzles relative to the other nozzle.

Operating two adjacent fuel nozzles at different pressure ratios will usually mean that a pressure of the fuel being delivered to a first nozzle is higher than a pressure of the fuel being delivered to a second adjacent nozzle. And when this occurs, the fuel nozzle with the higher fuel pressure will tend to deliver greater amounts of fuel into the airflow. This unbalanced delivery of fuel into the combustor can result in incomplete combustion, which in turn leads to undesirable combustion by-products. Accordingly, it is not always possible to operate two adjacent fuel nozzles at different pressure ratios.

In a similar manner, if it is necessary to operate two adjacent fuel nozzles simultaneously, one can reduce or eliminate undesirable noise by having one of the two adjacent fuel nozzles deliver fuel at a first flow rate, and by having the second of the two adjacent nozzles deliver fuel at a second different flow rate. The differences in the flow rates of the two nozzles appears to reduce or eliminate the generation of undesirable noise. Here again, however, this can lead to an unbalanced flow condition within the combustor which leads to incomplete combustion and the generation of undesirable emissions.

Figure 1:
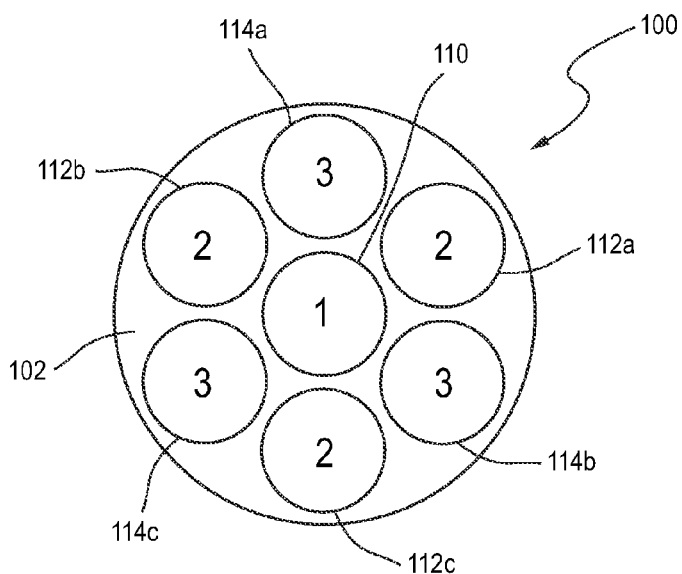
FIG. 1 is a diagram illustrating a combustor cap assembly which includes a plurality of fuel nozzles.

FIG. 1 illustrates a typical combustor cap assembly 100 which includes a combustor cap 102 and a plurality of fuel nozzles. The fuel nozzles include a central fuel nozzle 110, a first subset 112a, 112b, 112c of the remaining fuel nozzles which are arranged symmetrically around the central fuel nozzle 110, and a second subset 114a, 114b, 114c of the remaining fuel nozzles which are also arranged around the central fuel nozzle 110 in a symmetrical fashion.

It is often desirable to operate a turbine engine at varying load conditions. One can vary the amount of power output by the turbine engine by controlling the amount, or flow rate, of fuel being delivered into the combustor through the nozzles. This can be accomplished by only operating a subset of all of the available fuel nozzles at any given time.

Figure 2:
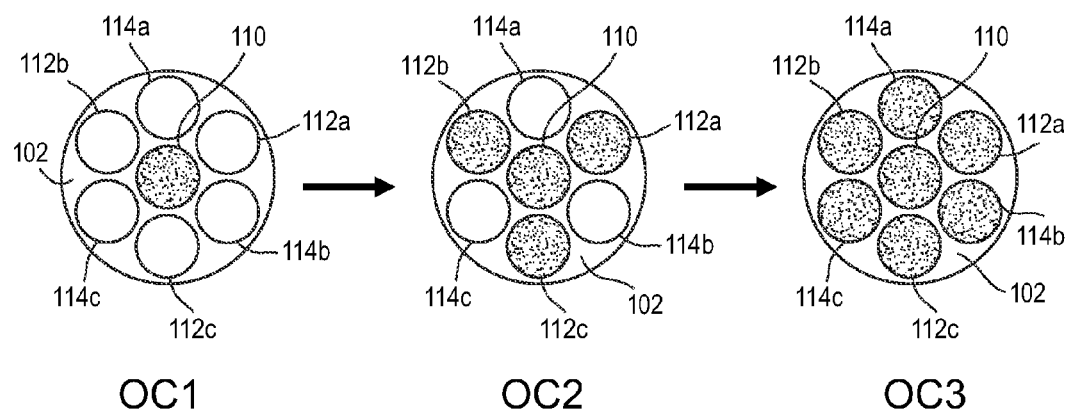
FIG. 2 is a diagram illustrating how the combustor cap assembly of FIG. 1 can be operated in three different operational conditions.

FIG. 2 illustrates a combustor cap assembly 110 operating under three different operational conditions, each of which would result in the turbine producing a different amount of power. In FIG. 2, and in many of the other Figures, some fuel nozzles are shown with just a white area inside the nozzle to indicate that no fuel is flowing out of the nozzle. Other nozzles are shown with shading in the center of the nozzle to indicate that fuel is flowing out of those nozzles. Thus, any shaded portions of a nozzle indicate that fuel is flowing out of the shaded portion.

In operational condition 1 (OC1), which appears at the far left in FIG. 2, only the central nozzle 110 is outputting fuel into the combustion zone of the combustor. Operational condition 1 would correspond to the lowest power setting.

When it is desirable to increase the amount of power output by the turbine engine, the operators would switch from operation condition 1 to operational condition 2 (OC2), which is illustrated at the center of FIG. 2. In operational condition two, both the center nozzle 110 and the first subset 112a, 112b, 112c of the remaining fuel nozzles are delivering fuel into the combustor. Operational condition 2 would correspond to a medium power setting.

When it is desirable for the turbine to produce even greater amounts of power, the operators would switch from operational condition two to operational condition 3 (OC3), which is illustrated on the right side of FIG. 2. In operational condition 3, all of the fuel nozzles are outputting fuel into the combustor.

In all operational conditions, fuel is being delivered into the combustor in essentially a symmetrical fashion. For instance, in operational condition 1, all of the fuel is delivered into the center of the combustor. In operational condition 2, fuel is delivered into the center and to the peripheral sections of the combustor, and the second subset 112a, 112b and 112c of the nozzles ensure that the fuel delivered into the peripheral portions of the combustor is delivered in a symmetrical fashion. Further, in operational condition 3, because all nozzles are delivering fuel into the combustor, the fuel is being delivered in a symmetrical fashion.

If fuel were not delivered into the combustor in a symmetrical fashion, the result would likely be incomplete combustion and the generation of undesirable or harmful emissions, and the overall performance of the turbine would be degraded. In addition, this might also cause the excitation of very high frequency noise in the range of 1-10 kHz.

Figure 3:
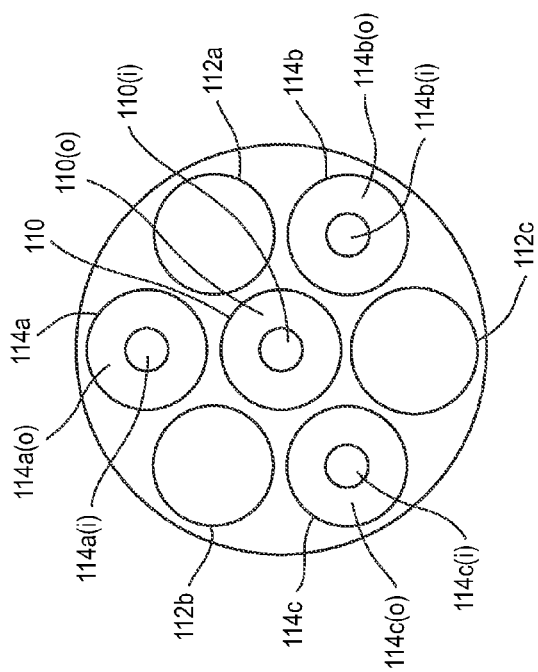
FIG. 3 is an illustration of another combustor cap assembly which includes some fuel nozzles having first and second fuel circuits.

FIG. 3 illustrates another combustor cap assembly for a turbine engine. The combustor cap assembly illustrated in FIG. 3 allows for the symmetrical injection of fuel into the air flowing through a combustor, and this embodiment also helps to reduce or eliminate the generation of undesirable noise.

In the embodiment illustrated in FIG. 3, the center fuel nozzle 110 includes two different fuel circuits. A first or inner fuel circuit 110(i) delivers fuel to the center of a downstream end of the center fuel nozzle 110. In addition, a second or outer fuel circuit 110(o) delivers fuel through an outer annular ring at the downstream end of the fuel nozzle. The first and second fuel circuits are independently controllable so that fuel can be delivered through only the inner fuel circuit 110(i), or only the outer fuel circuits 110(o), or through both the inner 110(i) and outer 110(o) fuel circuits simultaneously.

Figure 7:
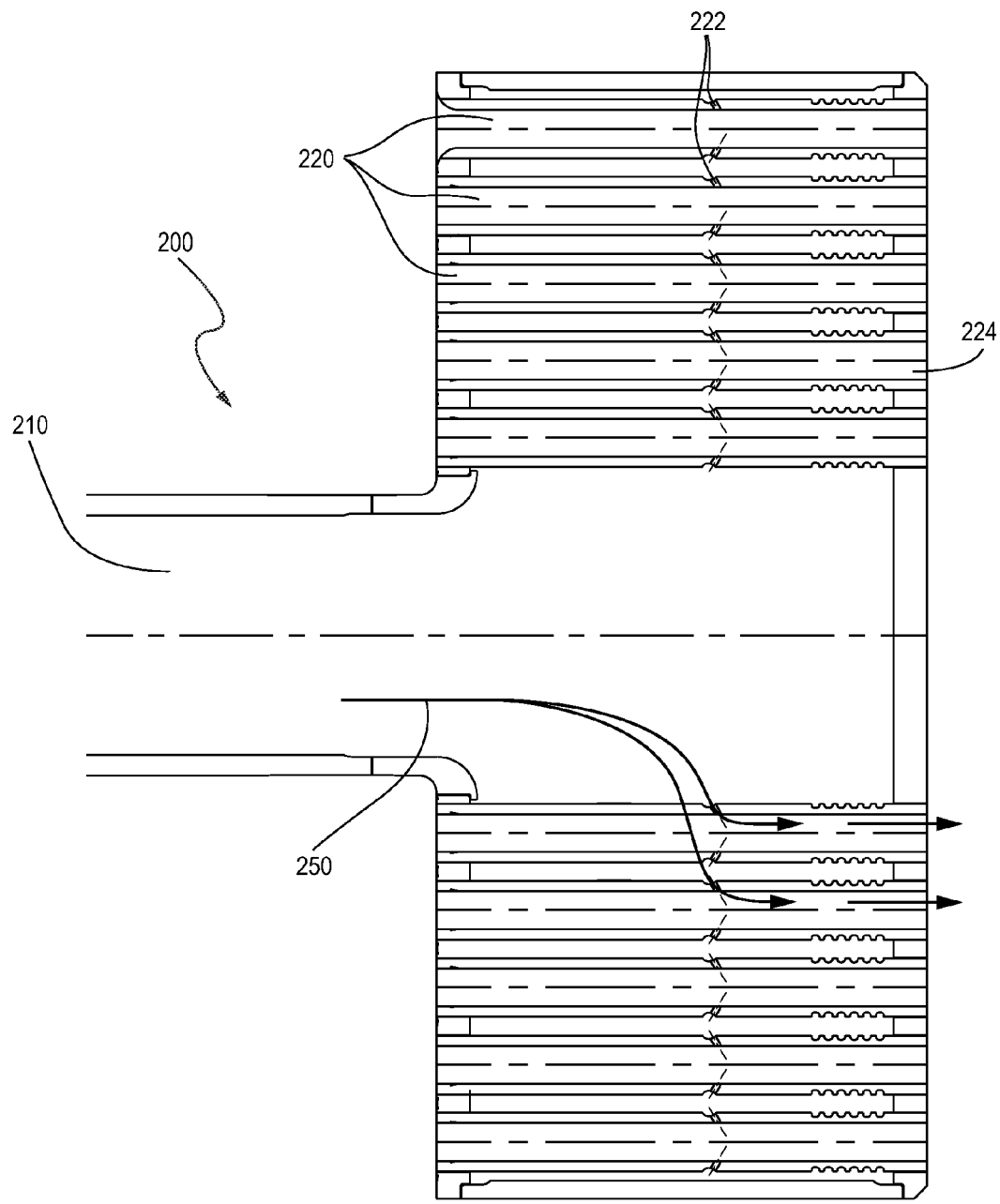
FIG. 7 is a diagram illustrating a fuel nozzle assembly which can be used in a combustor cap assembly.

FIG. 7 illustrates a fuel nozzle which could be used in one of the combustor cap assemblies embodying the invention. As illustrated in FIG. 7, the fuel nozzle 200 includes a fuel delivery passageway 210 which leads to a plurality of individual fuel pipes 220. Fuel inlets 222 are located along each of the individual fuel pipes 220.

Fuel enters the nozzle 200 through the fuel passageway 210. The fuel then travels to the inlets 222 of each of the individual fuel pipes 220. The fuel then is mixed with air flown from pipe inlet 220 and the air-fuel mixture travels through the fuel pipe 220 to the downstream ends 224 of the individual fuel pipes 220. The fuel-air mixture then exits the fuel pipes 220 into the combustion chamber of the combustor (not shown). This flow of the fuel is illustrated by the arrows identified with reference numeral 250.

Figure 8:
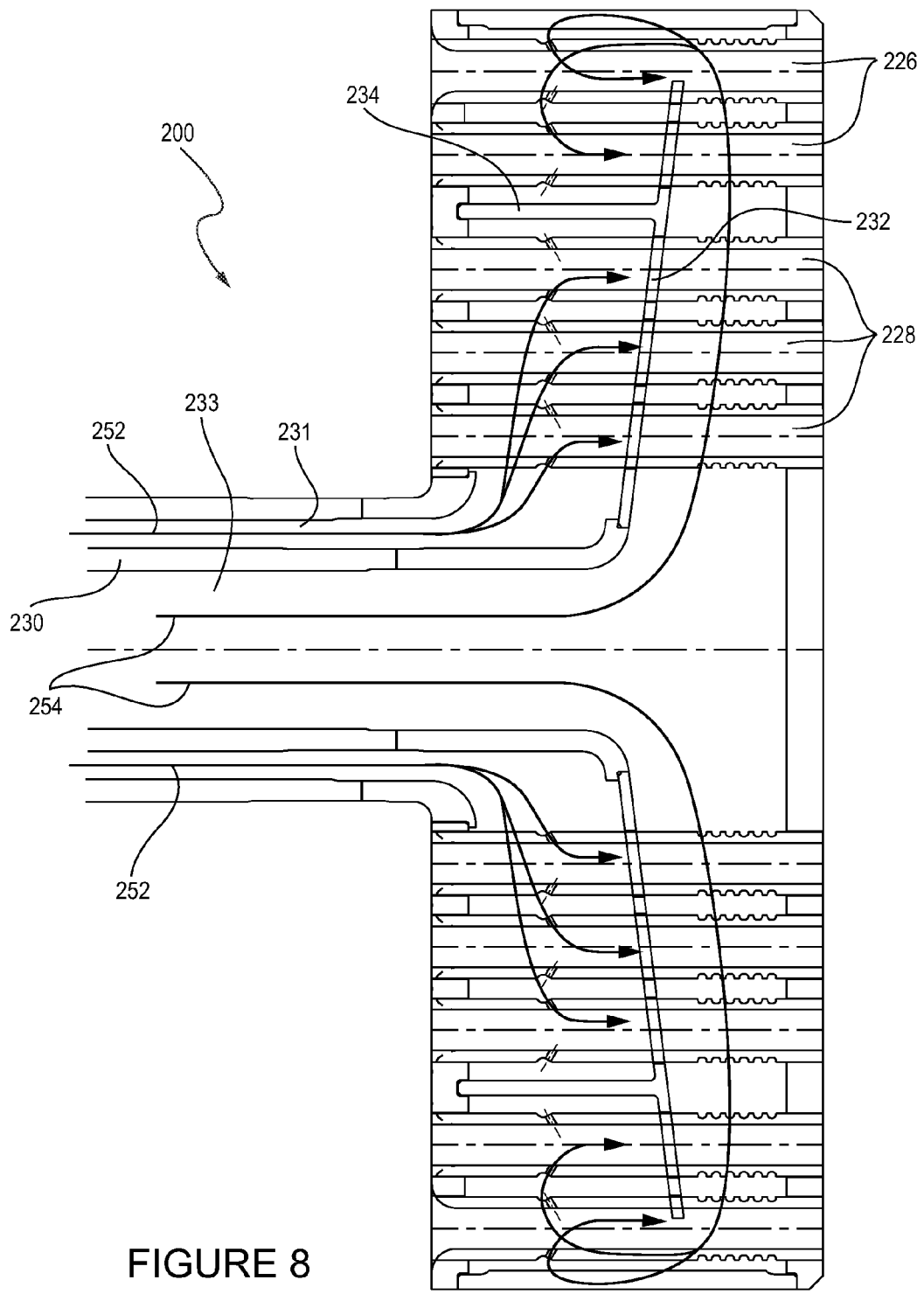
FIG. 8 is a diagram illustrating a first embodiment of a fuel nozzle which includes first and second fuel circuits.

FIG. 8 illustrates one embodiment of how a fuel nozzle as illustrated in FIG. 7 can be modified to include first and second individually controllable fuel circuits. The first fuel circuit would be an inner fuel circuit which allows fuel to be delivered from the central portion of the downstream end of the nozzle. The second fuel circuit would be an outer fuel circuit which allows fuel to be delivered from only the outer annular portion of the downstream end of the nozzle.

As illustrated in FIG. 8, the nozzle includes a barrier structure which includes a first barrier portion 230 which is generally cylindrical and which extends down through the fuel supply passageway of the nozzle. The first barrier portion 230 leads to a radially extending portion 232 which extends out through the area where the fuel pipes are located. A third barrier portion 234 extends rearward from the radially extending portion 232. The barrier elements 230, 232, 234 separate the fuel passing through the fuel nozzle into a first fuel circuit and a second fuel circuit.

Fuel flowing through a first fuel circuit passes along an annular passageway 231 located between an outer surface of the first barrier portion 230 and an inner surface of the exterior of the fuel nozzle. This fuel is directed to the fuel pipes 228 located at the center of the fuel nozzle. The arrows identified with reference numeral 252 show how fuel would flow through the first fuel circuit to enter the fuel pipes 228 located at the center of the fuel nozzle.

Fuel flowing through a second fuel circuit first passes through the center of the first barrier portion 230. This fuel then flows towards the end face of the fuel nozzle and the fuel moves radially out around the end of the radially extending barrier 232. The fuel would then enter the fuel pipes 226 located at the outer annular portion of the fuel nozzle. The flow of fuel through the second fuel circuit is illustrated by the arrows identified with reference numeral 254.

As noted above, the flow of fuel through the first and second fuel circuits would be independently controllable. As a result, operators could choose to send fuel to only the first fuel circuit 231, which would result in fuel only being delivered through the fuel pipes 228 located at the center of the downstream end of the fuel nozzle. Alternatively, operators could cause fuel to only flow through the second fuel circuit, so that fuel is only delivered through the fuel pipes 226 located at the outer annular portion of the fuel nozzle. Operators could also cause fuel to travel through both the first and second fuel circuits so that fuel is delivered through all of the fuel pipes at the downstream end of the fuel nozzle.

Figure 9:
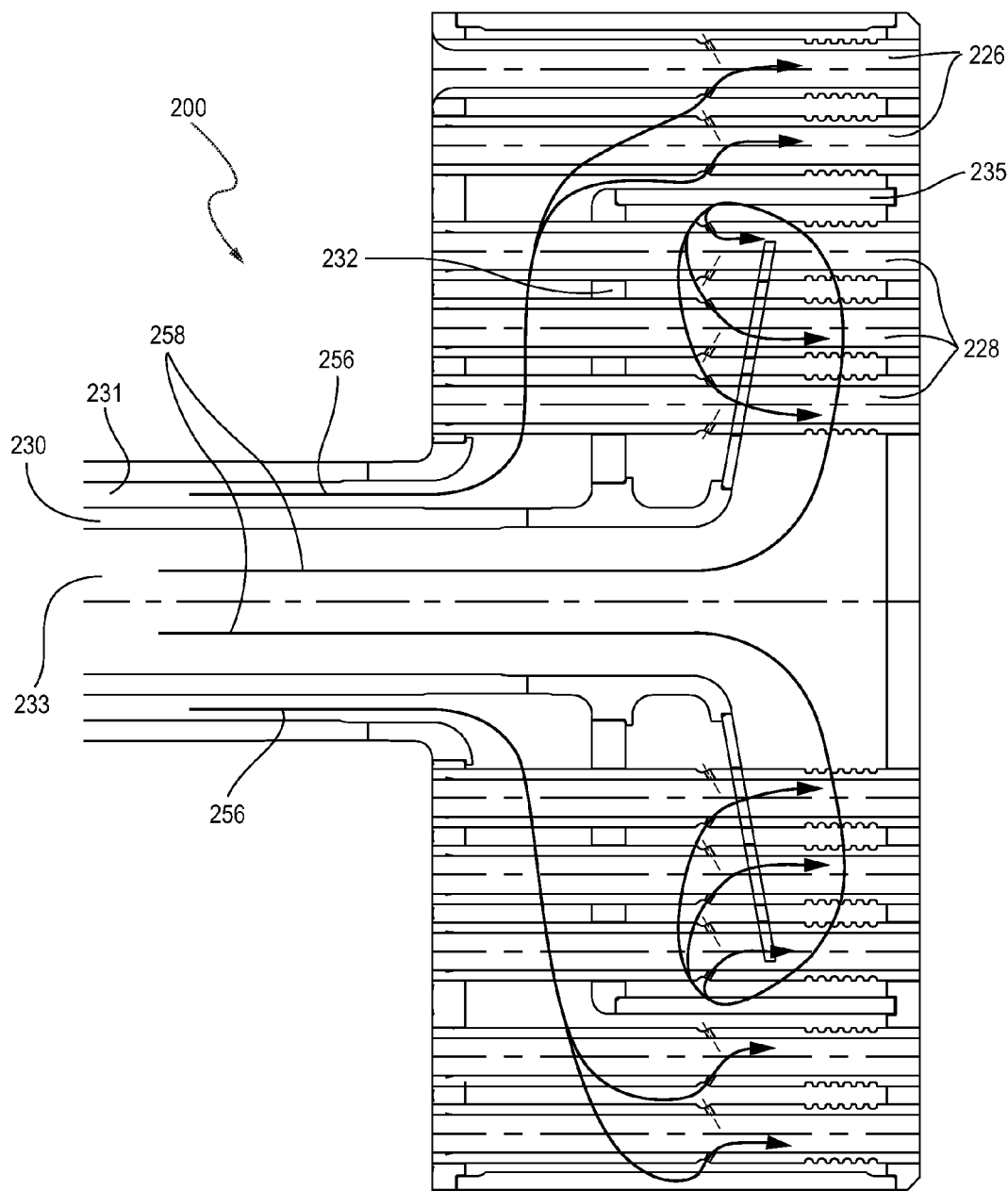
FIG. 9 is a diagram illustrating a second embodiment of a fuel nozzle having first and second fuel circuits.

FIG. 9 illustrates a second embodiment of a fuel nozzle which also includes first and second fuel circuits. In this embodiment, the barrier structure still includes a first cylindrical barrier portion 230 which extends down the length of the fuel nozzle. However, this barrier portion is joined to a differently configured radially extending portion 232 and a forward extending portion 235 which leads to the downstream end of the fuel nozzle.

In the embodiment illustrated in FIG. 9, fuel flowing through the center of the first barrier portion 230 is directed to the fuel pipes 228 located at the central portion of the downstream end of the fuel nozzle, as indicated by the arrows identified with reference numeral 258. Fuel flowing past the outer side of the first barrier portion 230 is directed to the outer fuel pipes 226 located at the outer annular portion of the fuel nozzle, as illustrated with the arrows identified with reference numeral 256.

The fuel nozzles illustrated in FIGS. 7, 8 and 9 are only intended to be illustrative. Individual fuel nozzles having first and second fuel circuits could be configured in a variety of different ways.

Further, although the fuel nozzles illustrated in FIGS. 8 and 9 are configured to deliver fuel through a first fuel circuit located towards the center of the nozzle and a second fuel circuit located towards an outer annular portion of the nozzle, in alternate embodiments the first and second fuel circuits could be configured to deliver fuel through other alternative portions of the fuel nozzle. For instance, the fuel nozzle could be divided into four pie-shaped portions. A first fuel circuit could deliver fuel to pie-shaped portions on diagonally opposite sides of the center of the fuel nozzle, and the second fuel circuit could be configured to deliver fuel to the other two pie-shaped portions of the fuel nozzle.

Moreover, in the embodiments illustrated in FIGS. 8 and 9, the fuel is separated into first and second fuel circuits. In alternate embodiments, a fuel nozzle could include more than two different fuel circuits.

Returning to a discussion of the combustor assembly illustrated in FIG. 3, a description will now be provided about how this combustor assembly can be used to deliver varying amounts of fuel into a combustor while at the same time reducing or eliminating the generation of undesirable noise.

As illustrated in FIG. 3, the combustor assembly includes a center nozzle 110 which includes an inner fuel circuit 110(i) and an outer fuel circuit 110(o). In addition, a first subset 114a, 114b and 114c of the remaining fuel nozzles also include inner fuel circuits and outer fuel circuits. A second subset 112a, 112b and 112c of the nozzles only include a single fuel delivery circuit.

Figure 4:
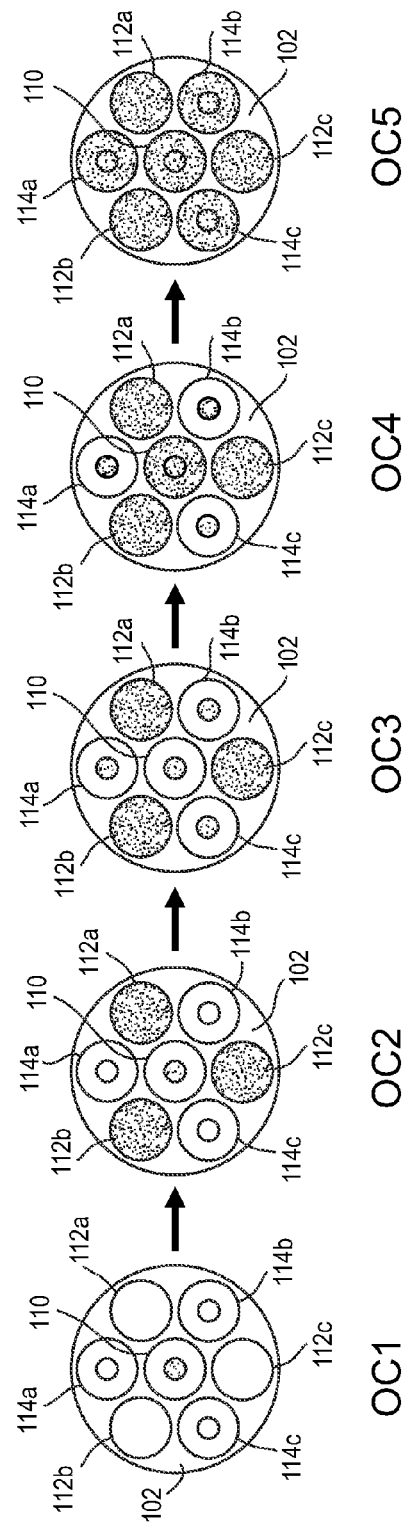
FIG. 4 is a diagram illustrating how the combustor cap of FIG. 3 can be operated in at least five different operational conditions.

FIG. 4 illustrates how a combustor cap assembly as illustrated in FIG. 3 can be operated in at least five different operational conditions to provide varying amounts of fuel into the combustor. The varying amounts of fuel delivered into the combustor in the five different operational conditions correspond to five different power settings for the combustor.

In operational condition 1 (OC1), which appears at the far left of FIG. 4, only the inner fuel circuit 110(i) of the central fuel nozzle 110 is delivering fuel into the combustor. This would correspond to the lowest power setting.

Operators could then switch from operational condition 1 to operational condition 2 (OC2) which is illustrated to the right of operational condition one. In operational condition 2, fuel is delivered into the combustor through the inner fuel circuit 110(i) of the central fuel nozzle 110 and also through the three nozzles which correspond to the second subset 112a, 112b, 112c of the fuel nozzles. This would correspond to a higher power setting.

In operational condition 2, fuel is being delivered into the combustor in a symmetrical fashion, which helps to promote even and complete combustion of the air-fuel mixture. In addition, because only the inner fuel circuit 110(i) of the central fuel nozzle 110 is delivering fuel, there is a physical separation between the flow of fuel exiting the nozzles. This physical separation of the fuel flows helps to reduce or eliminate the generation of undesirable noise.

It would also be desirable for the flow rate of fuel exiting the central nozzle 110 to be approximately equal to the flow rate of fuel exiting each of the second subset of nozzles 112a, 112b, 112c. Operating such that each nozzle contributes 25% of the total fuel delivered into the air flow helps to maintain fuel pressure ratios between the central nozzle and each of the second subset of nozzles 112a, 112b, 112c that lead to uncoupling of the flame interaction between adjacent nozzles.

In order to ensure that the flow rate of fuel exiting the inner fuel circuit 110(i) of the central fuel nozzle 110 is approximately equal to the flow rate of fuel exiting the other nozzles, it is necessary to provide the fuel to the inner fuel circuit 110(i) of the central nozzle 110 at a higher fuel pressure. And, as explained above, operating the central fuel nozzle at a different (in this case, higher) pressure differential than the adjacent fuel nozzles 112a, 112b, 112c also helps to reduce or eliminate the generation of undesirable noise. Thus, mitigation of undesirable noise occurs both because of a physical separation between the flows of fuel from adjacent nozzles, and because adjacent nozzles are being operated at different pressure differentials.

In operational condition 3 (OC3), which appears at the center of FIG. 4, fuel is being delivered into the combustor through the inner fuel circuit 110(i) of the central fuel nozzle 110, through each of the fuel nozzles in the second subset 112a, 112b, 112c, and through the inner fuel circuits of the first subset 114a, 114b and 114c of the nozzles. This would correspond to a medium power setting.

Here again, because fuel is only flowing from the inner fuel circuit 110(i) of the central nozzle 110 and from the inner fuel circuits 114a(i), 114b(i) and 114c(i) of the first subset of nozzles, there is a physical separation between the flow of fuel exiting each of the nozzles. This helps to reduce or eliminate the generation of undesirable noise.

Moreover, it is desirable for the flow rate of fuel from each of the nozzles to be approximately equal, to thereby maintain an even distribution of fuel within the combustor. This means that fuel must be supplied to the center fuel circuits 110(i) 114a(i), 114b(i), 114c(i) at a higher pressure than the fuel supplied to the second subset 112a, 112b, 112c of nozzles. And the varying pressure differentials between adjacent fuel nozzles also helps to reduce or eliminate the generation of undesirable noise.

In operational condition 4 (OC4), fuel is being delivered into the combustor through all of the same nozzles and fuel circuits as in operational condition 3, and through the outer fuel circuit 110(o) of the center fuel nozzle. This still provides a physical separation between the fuel exiting the inner fuel circuits 114a(i), 114b(i) and 114c(i) of the first subset of nozzles and the fuel being delivered through the remaining nozzles. This also results in varying pressure differentials being applied through many of the adjacent fuel nozzles.

In operational condition 5 (OC5), which appears at the right of FIG. 4, fuel is delivered through all of the fuel circuits of all of the nozzles. This would correspond to the highest power setting.

A combustor cap assembly as illustrated in FIGS. 3 and 4 allows for finer control of the power settings of the turbine. In addition, the selective use of the inner and outer fuel circuits of certain fuel nozzles helps to reduce or eliminate the generation of undesirable noise.

Figure 5:
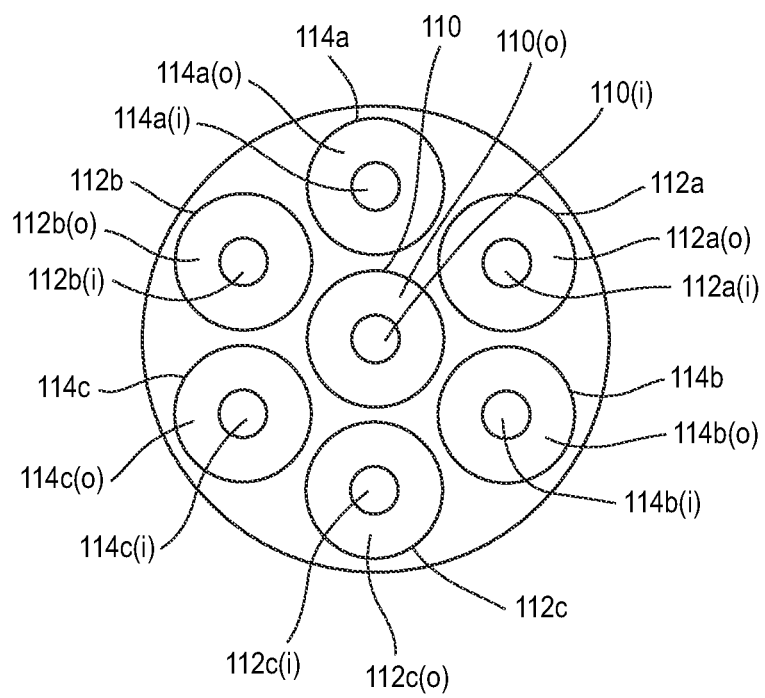
FIG. 5 is a diagram illustrating a combustor cap assembly wherein each of the fuel nozzles includes first and second fuel circuits.

FIG. 5 illustrates another embodiment of a combustor cap assembly. In the embodiment illustrated in FIG. 5, all seven of the fuel nozzles include an inner fuel circuit and an outer fuel circuit. By providing a combustor cap assembly where all seven of the nozzles include first and second fuel circuits which are individually controllable, one can provide an even finer degree of control over the power settings.

Figure 6:
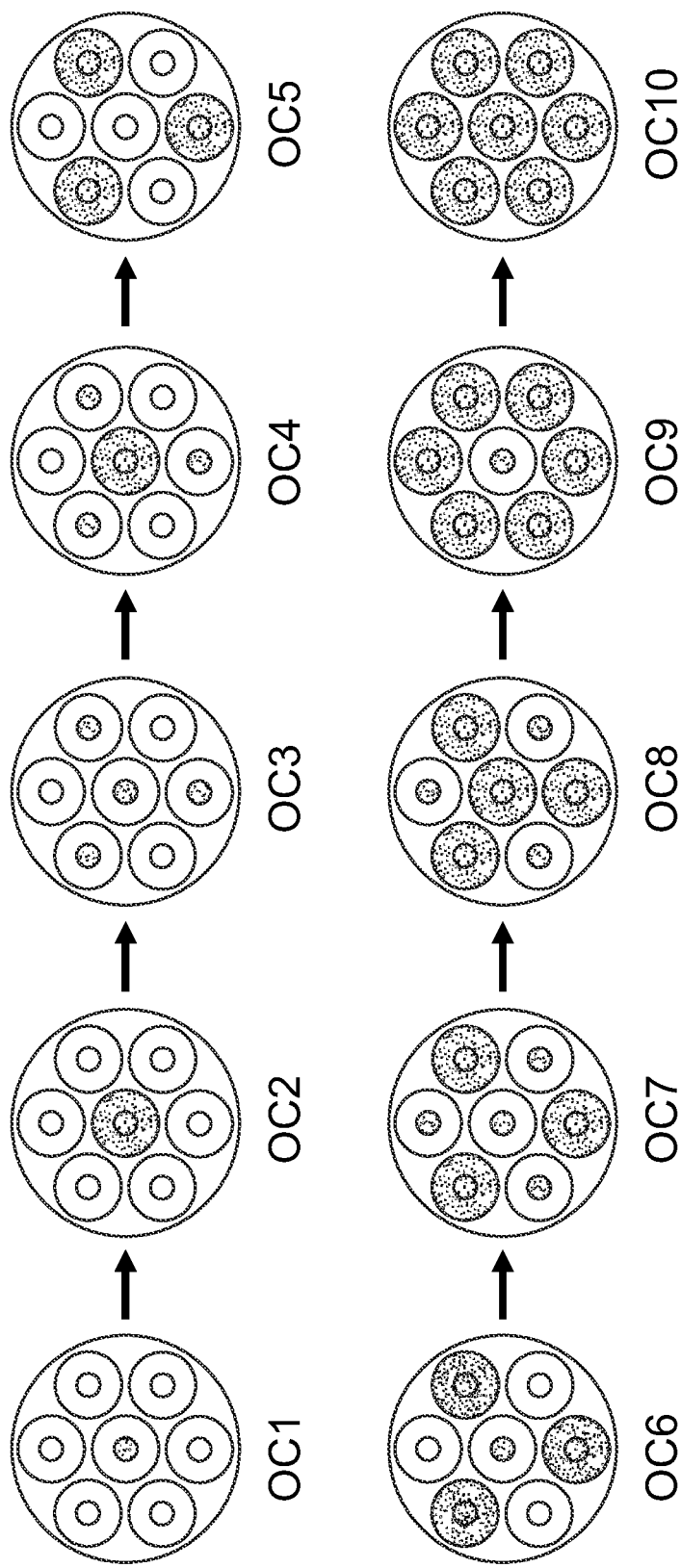
FIG. 6 is a diagram illustrating how the combustor cap assembly of FIG. 5 can be operated in ten different operational conditions.

FIG. 6 illustrates how the combustor cap assembly of FIG. 5 can be operated in ten different operational conditions, each of which can provide a different power setting for the turbine engine. The shaded portions of the inner and outer fuel nozzles illustrate how selectively using only the inner or the outer fuel circuits, or both fuel circuits, can help to provide a physical separation of the fuel streams. This can also help of maintain different pressure differentials between adjacent fuel nozzles. As one progresses from operational condition 1 to operational condition 10, greater and greater amounts of fuel would be delivered into the air flow to provide greater and greater amounts of power.

In the embodiments described above, seven fuel nozzles were mounted on a combustor cap. In alternate embodiments, different numbers of fuel nozzles could be mounted on a combustor cap assembly. For instance, a combustor cap assembly could include four nozzles, where one nozzle is located at the center, and the remaining three nozzles are arranged symmetrically around the center nozzle. In addition, the fuel nozzles could be positioned differently so that no fuel nozzle is located at the center, but such that the fuel nozzles are still arranged in a symmetrical fashion around the combustor cap. Both lesser numbers and greater numbers of fuel nozzles than those shown and described above can be used in a combustor cap assembly embodying the invention.

Likewise, the individual fuel nozzles of a combustor cap assembly embodying the invention could include two independently controllable fuel circuits, or they could include greater numbers of independently controllable fuel circuits. As also explained with reference to FIGS. 3 and 4, some of the individual fuel nozzles of a combustor cap assembly may only include a single fuel circuit, while other nozzles within the same combustor cap assembly can include two or more individually controllable fuel circuits.

Figure 10:
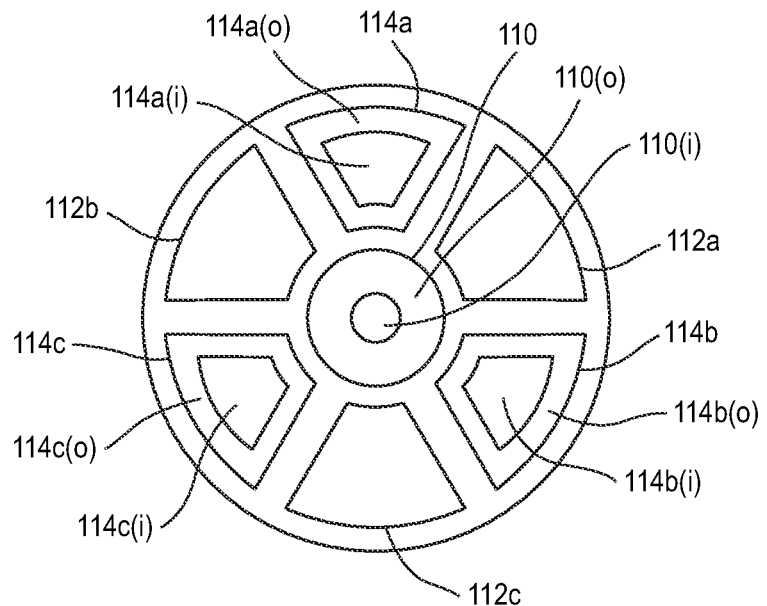
FIG. 10 is an illustration of another combustor cap assembly which includes some fuel nozzles having first and second fuel circuits.

FIGS. 9 and 10 illustrate combustor cap assemblies where the central fuel nozzle is circular, and where the fuel nozzles surrounding the central fuel nozzle are shaped like truncated pie slices.

In the embodiment illustrated in FIG. 10, the center fuel nozzle 110 includes an inner fuel circuit 110(i) and an outer fuel circuit 110(o). The inner and outer fuel circuits are independently controllable.

In addition, a first subset 114a, 114b and 114c of the remaining fuel nozzles also include inner fuel circuits and outer fuel circuits. A second subset 112a, 112b and 112c of the nozzles only include a single fuel delivery circuit. As shown in FIG. 10, both the first subset and second subset of fuel nozzles have a pie shape, with the pointed end of the pie cut off to accommodate the center fuel nozzle 110. This embodiment is quite similar to the one illustrated in FIG. 3, except that the fuel nozzles that surround the center fuel nozzle have a different shape.

Figure 11:
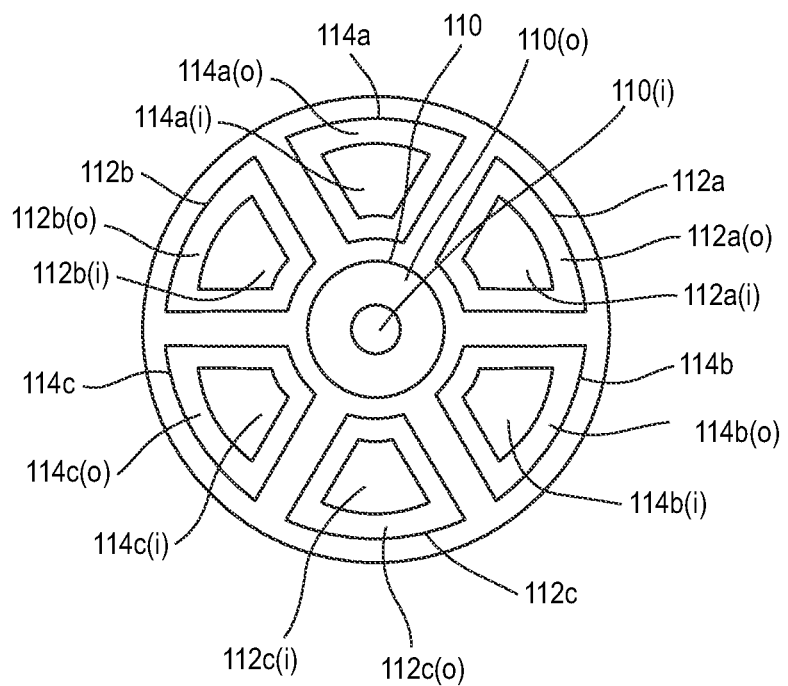
FIG. 11 is a diagram illustrating a combustor cap assembly wherein each of the fuel nozzles includes first and second fuel circuits.

FIG. 11 illustrated another embodiment which is similar to the one illustrated in FIG. 10. In this embodiment, however, all of the fuel nozzle surrounding the center fuel nozzle have both inner and outer fuel circuits that are independently controllable. Thus, this embodiment is similar to the one illustrated in FIG. 5, except that the fuel nozzles that surround the center fuel nozzle have a different shape.

The operation of the embodiments illustrated in FIGS. 10 and 11 would be essentially the same as described previously for the embodiments illustrated in FIGS. 3 and 5, respectively.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A combustor cap and fuel nozzle assembly for a turbine engine, comprising:
    a combustor cap; and
    a plurality of fuel nozzles mounted on the combustor cap, wherein a plurality of fuel nozzles includes a first fuel circuit that delivers fuel from only a central portion of a downstream end of the fuel nozzle and a second fuel circuit that delivers fuel from only an outer annular portion of the downstream end of the fuel nozzle, and wherein a flow of fuel through the first and second fuel circuits is independently controllable, wherein a first one of the multiple fuel nozzles with the first and second fuel circuits is located at a center of the combustor cap, wherein a first subset of the remaining fuel nozzles includes the first and second fuel circuits, the first subset being arranged symmetrically around the central fuel nozzle, and wherein a second subset of the remaining fuel nozzles have only a single fuel circuit, the second subset also being arranged symmetrically around the central fuel nozzle.

2. The combustor cap and fuel nozzle assembly of claim 1, wherein the plurality of fuel nozzles can be operated in a first operational condition where only the first fuel circuit of the central fuel nozzle delivers fuel.

3. The combustor cap and fuel nozzle assembly of claim 2, wherein the plurality of fuel nozzles can also be operated in a second operational condition where only the first fuel circuit of the central fuel nozzle and the second subset of fuel nozzles deliver fuel.

4. The combustor cap and fuel nozzle assembly of claim 3, wherein the plurality of fuel nozzles can also be operated in a third operational condition where only the first fuel circuit of the central nozzle and the first fuel circuits of the first subset of nozzles deliver fuel.

5. The combustor cap and fuel nozzle assembly of claim 3, wherein the plurality of fuel nozzles can also be operated in a third operational condition where only the first fuel circuit of the central nozzle, the first fuel circuits of the first subset of nozzles and the second subset of nozzles deliver fuel.

6. The combustor cap and fuel nozzle assembly of claim 5, wherein the plurality of fuel nozzles can also be operated in a fourth operational condition where only the first and second fuel circuits of the central nozzle, the first fuel circuits of the first subset of nozzles and the second subset of nozzles deliver fuel.

7. The combustor cap and fuel nozzle assembly of claim 1, wherein all of the plurality of fuel nozzles have a generally circular cross-sectional shape.

8. The combustor cap and fuel nozzle assembly of claim 1, wherein the at least one fuel nozzle is located at a center of the combustor cap and the remaining fuel nozzles are arranged symmetrically around the central fuel nozzle, wherein the central fuel nozzle has a generally circular cross-sectional shape, and wherein the fuel nozzles arranged symmetrically around the central fuel nozzle have a cross-sectional shape like a truncated pie slice.

9. The combustor cap and fuel nozzle assembly of claim 1, wherein the at least one fuel nozzle is located at a center of the combustor cap and the remaining fuel nozzles are arranged symmetrically around the central fuel nozzle, wherein the central fuel nozzle has a generally circular cross-sectional shape, and wherein the fuel nozzles arranged symmetrically around the central fuel nozzle have a generally trapezoidal cross-sectional shape.

10. A combustor cap and fuel nozzle assembly for a turbine engine, comprising:
a combustor cap;
a central fuel nozzle mounted at a center of the combustor cap;
a first subset of fuel nozzles mounted symmetrically around the central fuel nozzle; and
a second subset of fuel nozzles mounted symmetrically around the central fuel nozzle, wherein the central fuel nozzle and the first subset of fuel nozzles all have a first fuel circuit that delivers fuel from only a central portion of a downstream end of the fuel nozzle and a second fuel circuit that delivers fuel from only an outer annular portion of the downstream end of the fuel nozzle, wherein a flow of fuel through the first and second fuel circuits is independently controllable, wherein the first fuel circuits can be operated at different fuel pressures to deliver different flow rates of fuel, and wherein the first fuel circuit of a first fuel nozzle can operate at a first fuel pressure such that the first fuel nozzle delivers approximately the same flow rate of fuel as both the first and second fuel circuits of a second fuel nozzle that is operated at a second fuel pressure that is lower than the first fuel pressure.

11. A method of operating a combustor of a turbine engine, the combustor including a plurality of fuel nozzles mounted on a combustor cap, wherein a central fuel nozzle is mounted at a center of the combustor cap, wherein a first subset of the remaining fuel nozzles are mounted on the combustor cap symmetrically around the central fuel nozzle, wherein a second subset of the remaining fuel nozzles are mounted on the combustor cap symmetrically around the central fuel nozzle, and wherein the central fuel nozzle and the first subset of fuel nozzles each include a first fuel circuit that delivers fuel from only a central portion of a downstream end of the fuel nozzle and a second fuel circuit that delivers fuel from only an outer annular portion of the downstream end of the fuel nozzle, and wherein a flow of fuel through the first and second fuel circuits is independently controllable, the method comprising:
operating the combustor in a first operational condition where fuel is only delivered from the first fuel circuit of the central fuel nozzle;
operating the combustor in a second operational condition where fuel is only delivered from the first fuel circuit of the central fuel nozzle, from the first fuel circuits of the first subset of nozzles, and from the second subset of fuel nozzles.

12. The method of claim 11, further comprising operating the combustor in a third operational condition where fuel is delivered from the first and second fuel circuits of the central nozzle, and from the first fuel circuits of the first subset of nozzles.

13. The method of claim 12, further comprising operating the combustor in a fourth operational condition where fuel is only delivered from the first and second fuel circuits of the central nozzle, from the first fuel circuits of the first subset of nozzles, and from the second subset of nozzles.

14. The method of claim 11, further comprising operating the combustor in a third operational condition where fuel is delivered only from the first and second fuel circuits of the first subset of nozzles.

15. The method of claim 11, further comprising operating the combustor in a third operational condition where fuel is only delivered from the first fuel circuit of the central nozzle, and from the first fuel circuits of the first subset of nozzles.

16. The method of claim 11, further comprising operating the combustor in a third operational condition where fuel is delivered from only the first fuel circuit of the central nozzle and from the first and second fuel circuits of the first subset of nozzles, and from the second subset of nozzles.

* * * * *